Feb. 20, 1940.　　　C. ERICKSON ET AL　　　2,191,344
CONTINUOUS CONFECTION FREEZING APPARATUS
Filed Dec. 20, 1937　　　3 Sheets-Sheet 1
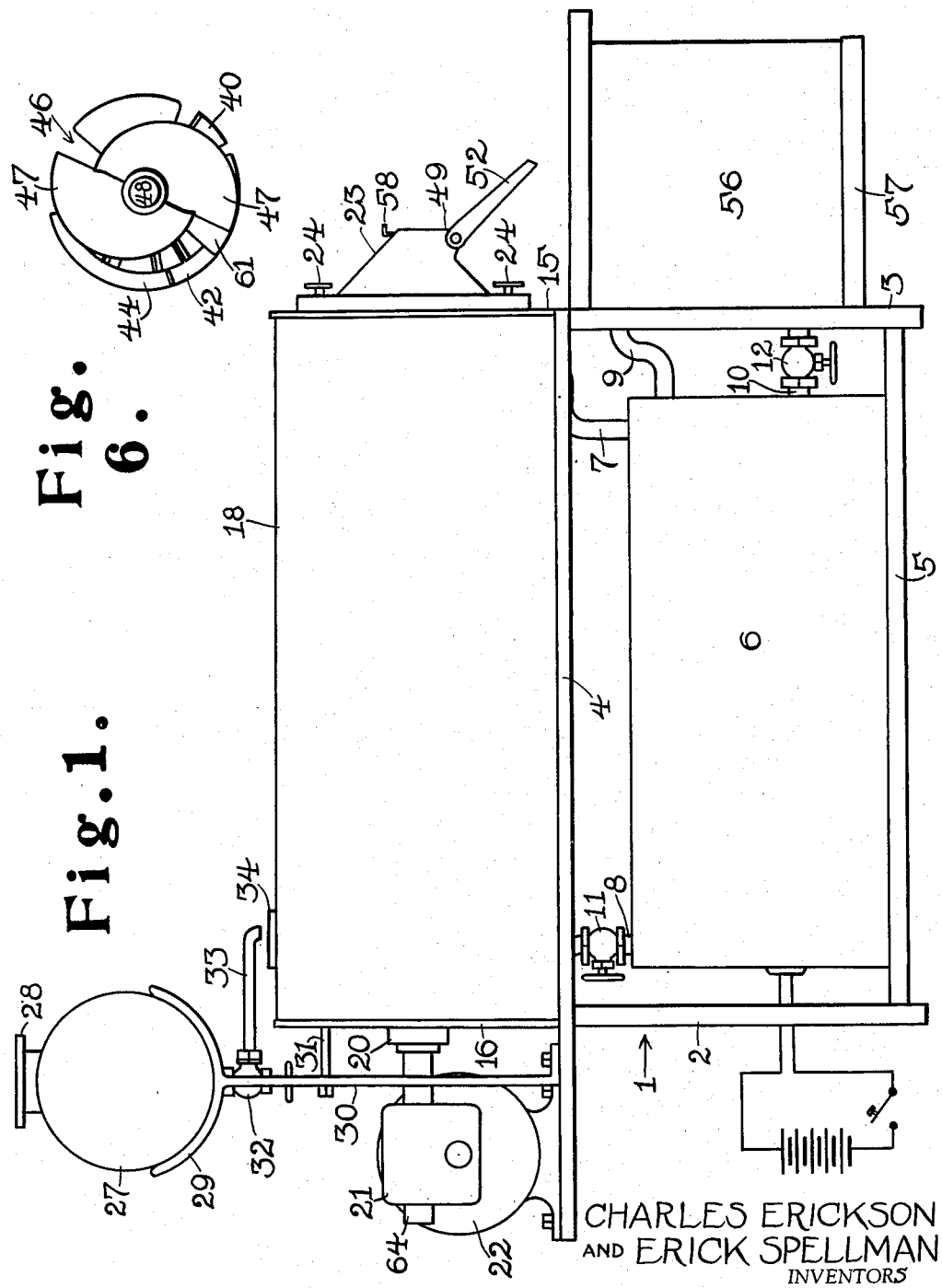
CHARLES ERICKSON
AND ERICK SPELLMAN
INVENTORS
BY C. F. Wm. Forssberg
ATTORNEY.

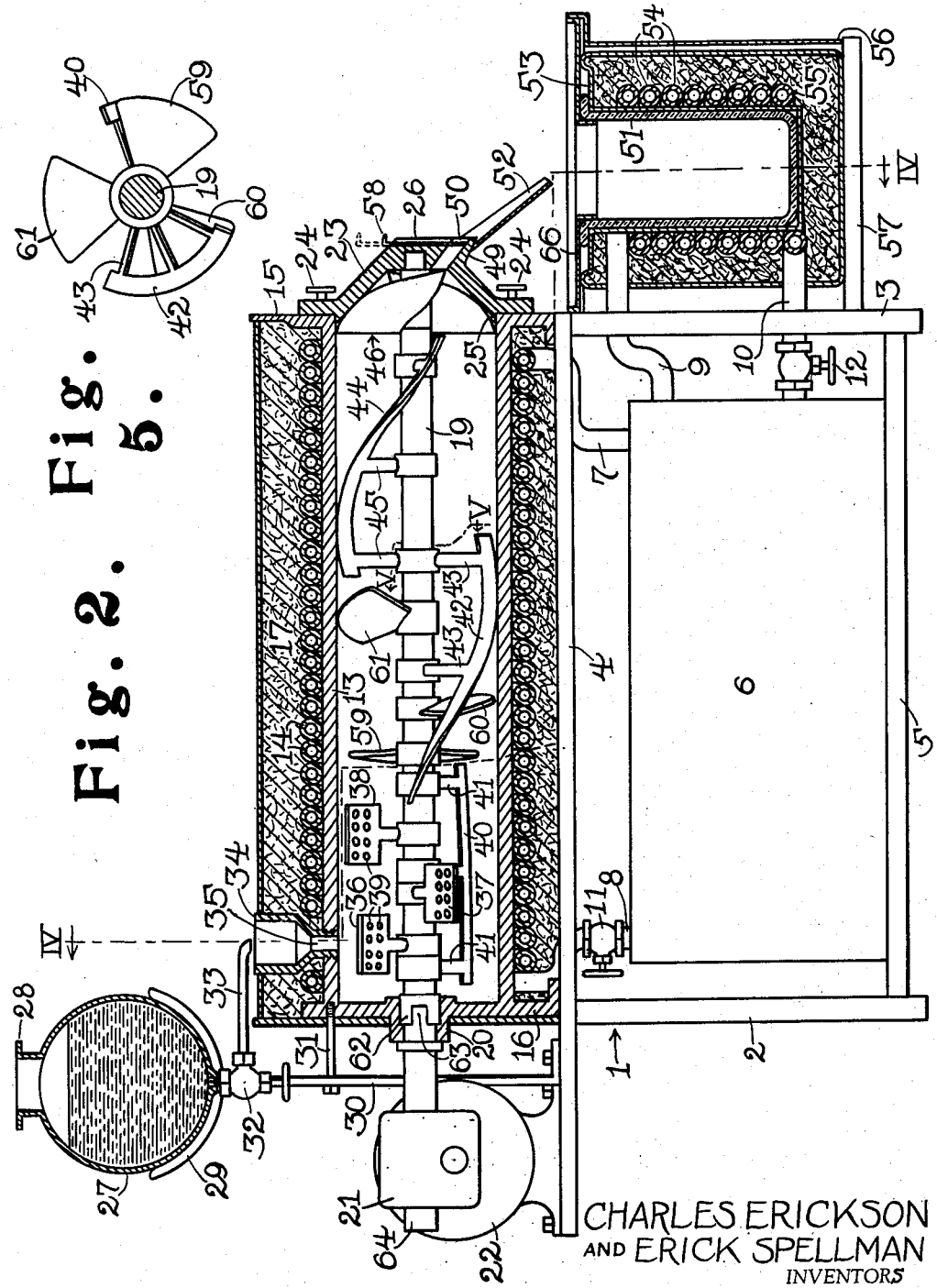

Feb. 20, 1940.   C. ERICKSON ET AL   2,191,344
CONTINUOUS CONFECTION FREEZING APPARATUS
Filed Dec. 20, 1937   3 Sheets-Sheet 3

CHARLES ERICKSON
AND ERICK SPELLMAN
INVENTORS

BY
ATTORNEY

Patented Feb. 20, 1940

2,191,344

UNITED STATES PATENT OFFICE 2,191,344

CONTINUOUS CONFECTION FREEZING APPARATUS

Charles Erickson and Erick Spellman, New York, N. Y.

Application December 20, 1937, Serial No. 180,691

12 Claims. (Cl. 62—114)

REISSUED
JUN 17 1941

This invention relates to an apparatus for freezing confection, ice creams and custards, etc., in continuous operation, without the use of ice and salt, and particularly that type which is completely self-contained and automatic in operation. The object of our invention is to provide an automatic machine for freezing various types of creams, custards, and the like, in continuous operation and capable of producing a uniform, smooth product of the highest quality.

Another object is to have a machine of this character which operates positively without using any pump or the like, for forcing the fluid starting material through the machine in order to feed the cream or the like, through the freezing zone to the discharging head of said machine.

A further object is to construct a machine of this character in such direct and simple manner that the same may be readily disassembled for cleaning and all parts requiring attention are easily accessible.

It is also an object of our invention to provide a machine of this type with a special feed shaft which is designed to knead and operate in predetermined manner in a series of successive conditions so as to properly beat, scrape and propel the cream, or the like, before, during, and after freezing, and definitely feed the same forward through the machine and urge the finished product out through the head of said machine.

Still another object is to produce a machine of this character which is reliable, durable, and substantial in construction, and economical and highly efficient in operation.

Another object could be mentioned such as providing not only the main portion of the machine with chilling coils for freezing the product within a cylinder in which the feed shaft rotates, but also providing a receptacle beneath the head of the machine with chilling coils to retain the finished product in freezing condition when received in said receptacle from said head.

Still other objects and the many advantages inherent in the design, construction, principles and operation of our machine will become more apparent in detailed manner as this specification proceeds.

In order to bring out the features of our invention in a comprehensive manner, the same is illustrated by way of example in a practical form in the accompanying drawings which form part hereof.

Hence, in Fig. 1, a machine made according to our invention is shown in side elevation.

Fig. 2 is a longitudinal section through the upper portion of the front end of the machine disclosing the interior construction and the relations of the parts.

Fig. 5 is a transverse section of the feed shaft of the machine taken on line V—V in Fig. 2.

Fig. 6 is a front elevation of the same feed shaft.

Throughout the views the same reference numerals indicate the same or like parts.

Figure 4:
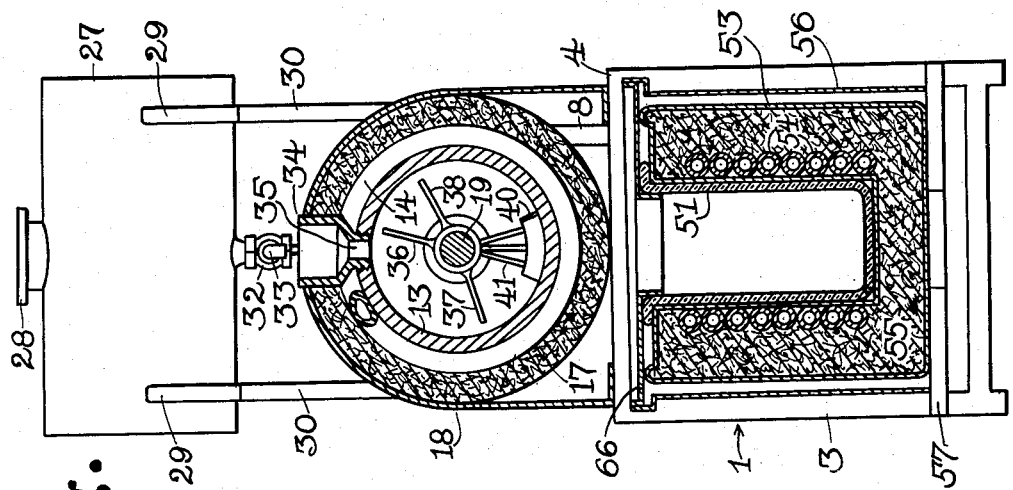
Fig. 4 is a transverse section of the machine upon line IV—IV in Fig. 2.
Figure 3:
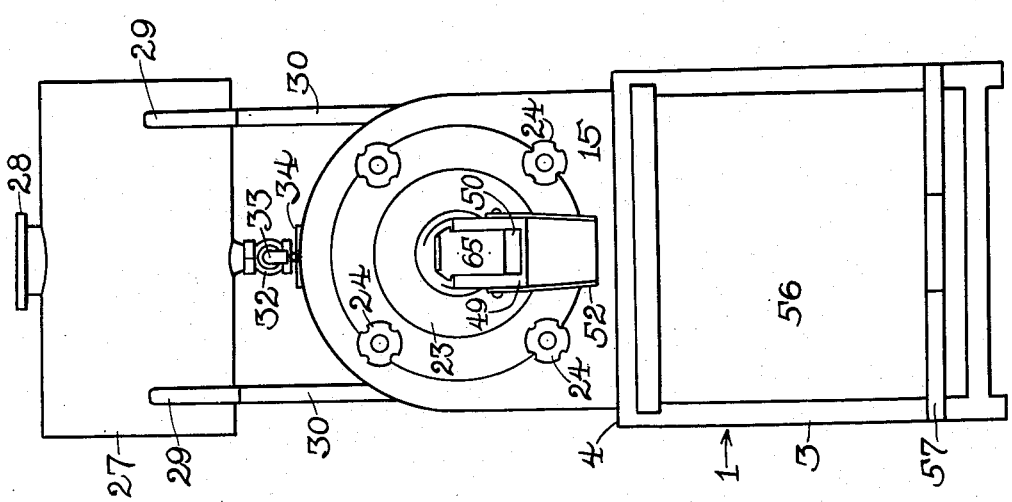
Fig. 3 is a front elevation of the same machine.

In the confectionary freezing art horizontal freezing apparatus has become a vogue and not without reason. It is theoretically attractive to feed cream, or the like through a horizontally disposed cylinder or tubular member which is exteriorly chilled, and force the same out through the far end of said cylinder because it should be theoretically easy to control such feeding of said cream since mechanical devices can be used for propelling the freezing mass slowly or rapidly, as may be found desirable, without serious interference or premature feeding by direct operation of gravity. However, although horizontal machines of this type have been produced the mentioned theoretical advantages have hardly appeared heretofore for several reasons, the main reason being that said machines have not been refrigerated by coils but by ice and salt; and another reason being that no practical and permissible means have until now been available for positively feeding the freezing material through the cylinder capable of cooperating with and utilizing gravity, at least in part, for such feeding or propulsion of the mass. The word permissible is used advisedly because gear pumps have been used and are, of course, mechanically operative but are nevertheless, seriously objected to by the various boards of health everywhere as such pumps require constant disassembling and cleaning.

In order to obviate these disadvantages, and particularly with the foregoing and other objects in view the present invention is intended to place the art of freezing creams and custards upon an entirely new basis and introduce a new standard of mechanical excellence, efficiency of operation, and quality of product.

Hence, in the practice of our invention, a table generally indicated at 1 and provided with legs similar to 2 and 3, is provided with an upper supporting portion or top 4, and the lower shelf or supporting portion 5 upon which a mechanical freezing unit, represented by the rectangle 55

6, is disposed. This unit may be electrical and of any suitable type, and in this respect the particular form of such freezing unit is of no consequence as several types are on the market, but in any case such freezing unit has tubes 7, 8, 9 and 10 and circulates a freezing fluid to various parts of the machine as will presently be explained. It might, however, be mentioned that pipes 8 and 10 may be controlled by valves 11 and 12 respectively, while on the other hand, an automatic master control valve may be connected to both pipes 8 and 10 in order to control flow through the same, and may even be arranged to control pipes 7 and 9 in addition, and for this purpose pipes 7 and 8, as well as pipes 9 and 10 may be connected in parallel or they may be connected in series.

Above the freezing unit 6 upon the table top 4 is a horizontally disposed cylinder 13 around which pipe coils similar to 14 are closely wound from practically one end of said cylinder to the other, said coils connecting with pipes 7 and 8 previously mentioned, so that freezing fluid from the freezing unit 6 may circulate about the cylinder and chill the wall thereof from end to end. The cylinder is provided at the forward end with a heavy supporting plate 15 and at the rear with a similar supporting plate 16, both of which rest upon the table top 4 and are rigidly secured to the same. About the pipe coils 14 upon the cylinder is a heavy layer of insulating mineral wool 17, or the like and a sheet metal cover 18 is arched over the whole between the end plate 15 and 16 and secured down upon or adjacent to the table top 4 so that the mentioned wool or fibrous insulating material about the pipe coils will be kept in place and concealed from view. Within the cylinder 13, is an axially disposed feed shaft 19 which passes through a bearing 20 in the rear plate 16, and is connected by a reducing gear mechanism 21 to a motor or other drive 22, the details of these last mentioned parts being superfluous to illustration as forming no essential part of the novelty of the present invention and being merely conventional. The front end of the shaft is carried in a bearing formed in a discharging head 23 removably secured upon the front plate 15 by means of hand screws 24, 24, etc., this discharging head having an interior flange 25 which effectively centers said head and thereby the bearing portion 26 of shaft 19. The features and operation of the feed shaft will be presently explained.

At a higher level than that of the cylinder 13, preferably at the rear of the machine, is a removable tank or supply container 27, having a top opening 28, through which to introduce a liquid mixture afterward intended to be frozen in the machine, said supply container being supported upon a pair of brackets similar to 29 having upright portions 30 secured upon the table top 4, and, if desired, also steadied by means of a bolt 31 or the like, secured to rear plate 16. The supply tank or container 27 may have a cylindrical form or any other form that is found convenient, and is provided at the lower portion with outlet control valve 32 and a feed pipe 33 which terminates approximately above the center of a funnel or receiving cup 34 which is screwed or otherwise attached to the upper part of the rear of cylinder 13 and connects with the interior thereof. If a proper liquid mixture for making frozen custard or the like, is poured into the supply tank 27 while the valve 32 is closed and the container placed into position upon brackets 29, it is obvious that upon opening valve 32 to the proper degree a continuous stream of fluid will descend from pipe 33 into the receiving cup 34, and said fluid will then descend at a predetermined rate through bottom aperture 35 of said cup into the interior of the cylinder to be beaten and frozen and also propelled forwardly to the front and expelled as will be immediately explained.

The said shaft 19 is provided near its rear end within cylinder 13, with a group of beaters 36, 37, 38, each of which may be perforated as at 39. The beaters or paddles serve to beat or churn the fluid custard in the rear portion of the cylinder as the mix enters and said mix is subjected to a predetermined chilling or initial freezing, and in order to make certain that the beating is effective and no accumulation of material occurs upon any portion of the interior wall of cylinder 13, a very slightly curved scraper 40 is arranged upon the shaft, being fixed thereto by means of radial arms 41, 41. The sphere of operation of the above mentioned paddles and scraper may be termed the first or chilling zone in as much as two other zones follow in the center and forward portions of the cylinder. The second zone forms the sphere of operation of a smooth, spirally shaped or curved scraper 42 which is mounted on arms 43, 43 fastened to the shaft 19, and serves not only to scrape the sides in the first actual freezing zone of the cylinder but also in a measure to propel the frozen material forwardly toward the front of the machine.

The third freezing zone within the cylinder is scraped by a scraper 44 having a curvature which is more pronounced than that of scraper 42 so that it will have not merely a scraping effect but an inclining shaving effect with respect to the direction of rotation, and will also tend to propel frozen custard or the like in a forward direction. It is thus evident that the scraper 40 which is but slightly curved out of parallel with shaft 19, is succeeded by a scraper 42 which is more curved, while scraper 44 is given a greater curvature than either of the previous scrapers because the frozen material as it advances through the cylinder tends to be frozen to the walls of said cylinder in a condition of increasing hardness. An increase of the inclined pitch or sidewise scraping effect is found to be very effective to scrape, mix and propel forward the material thus frozen. The scraper 44 is secured to the shaft by means of radial arms 45, 45. Upon the forward end of the shaft is fixed an expelling device somewhat resembling a screw propeller generally indicated at 46 and provided with spiral blades 47, 47. The general profile of the forward portion of the expelling device is preferably conical and registers just short of contact with the conical interior of the discharging head 23 immediately within the bearing portion 26 which supports the outer end 48 of the shaft. The discharging head is formed with a downwardly extending portion 49 through which a discharging channel 50 communicates with the interior of said head in order to allow the frozen custard or other material to issue from said discharging head under the propelling action of the feeding shaft 19. In this description, it has of course, been taken for granted that the pipe coils 14 surrounding the cylinder and having connected thereto pipes 7 and 8 with the freezing unit 6 have been in full operation so that the freezing fluid has been circulating through said pipe coils so as to chill the cylinder.

When, however, the frozen material issues from the channel 50 in projection 49 upon the discharging head 23, the same is preferably allowed to fall into container 51 while the frozen custard is guided as desired to the forward, rear, or center portions of said container by means of a swingable chute 52 pivoted to the discharging head below the outer opening of channel 50. The receiving vessel 51 is disposed within a fixed chilled holder 53 surrounded by a group of cooling coils 54 connected by pipes 9 and 10 to the freezing unit 6, while said holder and its cooling coils are wrapped with mineral wool, felt or other heat insulating material 55 which is retained in frozen condition for an indefinite period of time by reason of the cooling of said vessel by means of chilling coils 54.

Nevertheless, it may be observed that the length of shaft 19 is quite considerable between the bearings 20 and 26 thereof, so that the strain upon the shaft, intermediate the ends, caused by the scraping action particularly of scrapers 42 and 44, will be considerable and to some extent unbalanced. In order to compensate for the wide draft and in order to center the shaft and prevent bending thereof and render the operation of the scrapers entirely reliable, a plurality of bearing vanes 59, 60, and 61 are secured at various radial positions in the intermediate zone adjacent to and about the scraper 42 upon shaft 19, these bearing vanes serving both to form bearing members for the shaft against the inner wall of cylinder 13 and propeller blades to assist in propelling the frozen material forward through the cylinder in cooperation with the scrapers.

The shaft 19 which may be connected at the rear to the reducing gear mechanism 21, is preferably provided with a spider or other locking structure 62 adapted to positively engage with projections 63 of a short shaft 64 which actually extends beyond the rear bearing 20 into the mechanism 21 so that it will be possible to withdraw shaft 19 forwardly from within the cylinder when the discharging head 23 has been released from the front of the machine by unscrewing the hand screws 24, 24 for the purpose of cleaning the interior of the cylinder and shaft.

Although no mechanism is illustrated for the freezing unit 6 in as much as the details are well known and form no part of the present invention per se, it is understood that the same may be of any type as long as it suffices to supply a sufficient circulation of the freezing fluid or medium through the pipe coils 14 surrounding cylinder 13 and the coils 54 about the receiving vessel 51 with the result that said cylinder, said holder, and the vessel are chilled to a sufficient and predetermined extent causing successful operation of the machine. As has already been mentioned the freezing unit 6 may be electrically operated or operated from any source of power, although this is not illustrated as being too conventional to require showing.

When the shaft 19 is in place and the discharging head 23 in position, it is but necessary to start the motor 22 or other drive to operate mechanism 21 and its shaft 64 which will then cause shaft 19 in cylinder 13 to rotate in continuous manner. If then the freezing unit 6 is caused to start operation with the freezing medium circulating thru pipes 7, 8, 9 and 10 and the supply tank 27 is in position upon brackets 29 with a sufficient supply of liquid custard or the like, it will merely be necessary to open control valve 32 to a predetermined extent to allow a measured flow of liquid custard or the like from pipe 33 to descend into cup 34 and then thru aperture 35 into the interior of cylinder 13 where it will be beaten by the paddles 36, 37, 38, and initially scraped by the scraper 40 and propelled forwardly and frozen upon the walls in the path of scraper 42 and scraped and propelled forwardly by scraper 42 and to some extent also by bearing vanes 59, 60, 61, and further propelled and scraped forwardly by scraper 44 after which the frozen material will be urged out and expelled from discharging channel 50 in discharging head 23 by the expelling device 46 so as to accumulate in the receiving vessel 51. The operation if allowed to proceed as just described, will be entirely continuous as long as a supply of fluid is flowing into the receiving cup 34 through the pipe 33 from supply tank 27. When the requisite amount of frozen confection has been accumulated, it may be preferable to have a plate or apron 62 above the holder 53, which might be terminated then within the vessel 51, or may simply terminate at its edge as preferred.

The material of which the various parts are made may be varied to suit circumstances; for example, the freezing coil 14 and 54 may be of copper or bronze, or the cylinder may be of steel or white bronze, or any other metal or alloy, and the frame and main parts of the apparatus may be of iron, or steel, or more or less conventional, except as otherwise specifically set forth herein. It is obvious that the shaft 19 and its appurtenances should be of steel in order to be sufficiently strong, due to the heavy strain imposed upon it. It may be noted that it is not always essential that the scrapers shall have a definite pitch or inclination with respect to the shaft, but it is important that they are at least out of line.

Manifestly, variations of our invention may be resorted to within a wide scope, and parts may be modified or used without others, as long as the machine conforms to the principles involved.

Having now fully described our invention, we claim,

1. An apparatus for continuously freezing ice creams, fluid custards and the like, comprising a fixed hollow cylinder, means for exteriorly cooling said cylinder to freeze the contents thereof, said cylinder having one end closed and being provided in the upper portion of the same with a receiving cup connected with the interior of said cylinder and also having at the other end a removable discharging head, a feed shaft rotatably disposed within the cylinder and connected through the closed end of the latter with an exterior power drive, there being a bearing in said closed end for said shaft and said shaft having a bearing at the other end in said discharging head, at least one agitating means secured upon the feed shaft below the general position of said receiving cup for agitating fluid entering the cylinder from said cup, a scraper secured on said feed shaft in approximately the same portion of the cylinder as said agitating means and having greater longitudinal extension than said latter means, and being further disposed at a different angular position with respect to the axis of the shaft than said means, there being also an opening in the discharging head allowing the rotation of the shaft to cause feeding of frozen mixture scraped by said scraper from the walls of said cylinder out through said opening in said head to the exterior of the apparatus, there being also means for supplying liquid creams, custards and the like to said receiving cup, and at least one additional scraper secured on the feed shaft intermediate said first scraper and the discharging head and formed with a definite screw pitch in order to feed the frozen mixture forward from said agitating means and said first mentioned scraper toward the discharging head, and further means secured upon the shaft extending into said head for forcing the frozen material received from said additional scraper through the opening in said head.

2. An apparatus according to claim 1, wherein a further scraper having screw pitch is disposed intermediate the one additional scraper and the discharging head, each of the scrapers scraping an individual portion of the interior wall of the cylinder and contributing to the feeding of the frozen material toward the discharging head.

3. An apparatus for continuously freezing ice creams, fluid custards and the like, comprising a fixed hollow cylinder, means for exteriorly cooling said cylinder to freeze the contents thereof, said cylinder having one end closed and being provided in the upper portion of the same with a receiving cup connected with the interior of said cylinder and also having at the other end a removable discharging head, a feed shaft rotatably disposed within the cylinder and connected through the closed end of the latter with an exterior power drive, there being a bearing in said closed end for said shaft and said shaft having a bearing at the other end in said discharging head, at least one agitating means secured upon the feed shaft below the general position of said receiving cup for agitating fluid entering the cylinder from said cup, a scraper secured on said feed shaft in approximately the same portion of the cylinder as said agitating means and having a greater longitudinal extension than said latter means, and being further disposed at a different angular position with respect to the axis of the shaft than said means, there being also an opening in the discharging head allowing the rotation of the shaft to cause feeding of frozen mixture scraped by said scraper from the walls of said cylinder out through said opening in said head to the exterior of the apparatus, there being also means for supplying liquid creams, custards and the like to said receiving cup, and at least one additional scraper secured on the feed shaft intermediate said first scraper and the discharging head and at a different angular position with respect to said axis than that of the first mentioned scraper so as to be out of line therewith, for the purpose of feeding the frozen mixture forward from said agitating means and said first mentioned scraper toward the discharging head, and further means secured upon the shaft extending into said head for forcing the frozen material received from said additional scraper through the opening in said head.

4. An apparatus according to claim 3, wherein a further scraper is disposed intermediate the one additional scraper and the discharging head out of line with the first and additional scrapers, each of said scrapers scraping upon an individual portion of the interior wall of the cylinder and contributing to the feeding of the frozen material toward the discharging head.

5. An apparatus for continuously freezing ice creams, fluid custards and the like, comprising a fixed hollow cylinder, means for exteriorly cooling said cylinder to freeze the contents thereof, said cylinder having one end closed and being provided in the upper portion thereof with a receiving cup connected with the interior of said cylinder and also having at the other end a removable discharging head, a feed shaft rotatably disposed in said cylinder and connected through the closed end of the latter with an exterior power drive, there being a bearing in said closed end for said shaft and said shaft having a bearing at the other end in said discharging head, a plurality of radially disposed beating paddles secured upon the feed shaft below the general position of said receiving cup for agitating fluid entering the cylinder from said cup, a scraper secured on said feed shaft in approximately the same portion of the cylinder as said beating paddles and having greater longitudinal extension than said paddles and also disposed at a different angular position with respect to the axis of the shaft than any of the paddles, a second scraper secured upon said shaft intermediate the ends thereof and out of line with the first mentioned scraper, a third scraper secured upon a forward portion of the same shaft out of line with the first and second scrapers, there being also a discharge opening in said discharging head, means for supplying liquid creams, custards and the like to said receiving cup, and a discharging feed screw mounted upon the forward portion of the feed shaft forwardly of the third scraper and extending into the discharging head for forcing the frozen material from the three scrapers out through the discharge opening in said discharging head upon rotation of said feed shaft.

6. An apparatus according to claim 5, wherein the discharging head is interiorly concave in the direction facing the interior of the cylinder so as to accommodate the feed screw, and the said feed screw has a generally convex profile in the forward direction to correspond to the concavity of said discharging head.

7. An apparatus according to claim 5, wherein a plurality of radially disposed bearing members are secured to the feed shaft intermediate the ends thereof and which tend to bear against the inner wall of the cylinder in order to support said shaft and resist the strain imposed thereon by operation of the scrapers.

8. An apparatus according to claim 5, wherein a plurality of radially disposed bearing plates are secured to the feed shaft intermediate the ends thereof and generally pitched in the same feeding direction as the discharging feed screw, said bearing plates tending to bear against the inner wall of the cylinder so as to resist the strain imposed upon said shaft by the operation of the scrapers and to assist in propelling the frozen material within the cylinder due to their forward pitch.

9. An apparatus according to claim 5, wherein the first mentioned scraper upon the feed shaft is slightly pitched in the forward feeding direction so as to be nearly perpendicular with the axis of the shaft, and wherein the second scraper is provided with an increased pitch in the same feeding direction as that of the discharging feed screw, and wherein the third scraper has an even greater and more emphasized pitch in the same feeding forward direction.

10. An apparatus according to claim 5, wherein the three scrapers are located in three continuous and successive freezing zones in the cylinder, the first zone being a preliminary chilling zone in which the first scraper operates adjacent to the receiving cup, the second zone being a positive freezing zone in which the second scraper operates, and the third zone being a hard freezing and finishing zone in which the third scraper operates in proximity to the forward end of the cylinder, said zones being disposed in line and forming continuous portions of the interior of the cylinder and having the same general diameter throughout.

11. An apparatus according to claim 3, wherein a further scraper is disposed intermediate the one additional scraper and the discharging head, and the three scrapers are disposed out of line and in different angular positions with respect to the axis of the shaft, each of the scrapers scraping upon an individual portion of the interior wall of the cylinder and contributing to the feeding of the frozen material toward the discharging head, and by virtue of the individual radial position thereof also distributing the strains imposed upon said shaft by the scraping action of each scraper, and wherein the shaft has a discharging feed screw at the forward end cooperating with the discharging head so as to force frozen material out through the discharging opening therein from within the cylinder upon rotation of said shaft with its scrapers.

12. An apparatus according to claim 3, wherein the further means secured upon the shaft extending into the discharging head comprises a feed screw of generally convex profile, the discharging head having a corresponding concave portion to receive said feed screw, and wherein said discharging head has a flange adjoining said concave portion for the purpose of fastening onto the open end of the cylinder in order to center said head in position upon said end.

CHARLES ERICKSON.
ERICK SPELLMAN.